United States Patent [19]
Sim et al.

[11] Patent Number: 5,202,595
[45] Date of Patent: Apr. 13, 1993

[54] YOKE MEMBER FOR VOICE COIL MOTOR

[75] Inventors: Jun-seok Sim; Byeong-sang Yun, both of Seoul, Rep. of Korea

[73] Assignee: Samsung Electro-Mechanics Co., Ltd., Kyunggi, Rep. of Korea

[21] Appl. No.: 815,047

[22] Filed: Dec. 31, 1991

[30] Foreign Application Priority Data

May 31, 1991 [KR] Rep. of Korea ............... 91-9327

[51] Int. Cl.$^5$ ............................................. H02K 41/00
[52] U.S. Cl. ........................................ 310/13; 310/27
[58] Field of Search ................... 310/13, 14, 27, 30, 310/256, 258

[56] References Cited

U.S. PATENT DOCUMENTS 3,619,673 11/1971 Helms ................................ 310/13
4,652,779 3/1987 Wilcox ............................... 310/13
5,113,099 5/1992 Wong et al. ....................... 310/13

Primary Examiner—Steven L. Stephan
Assistant Examiner—Ed To
Attorney, Agent, or Firm—Leydig, Voit & Mayer

[57] ABSTRACT

A voice coil motor is disclosed which comprises a yoke member composed of a central portion forming magnetic path, left/right fringes and upper/lower fringes, a moving coil wound movably around the central portion of the yoke member, and permanent magnets being adhered on the upper/lower fringes of the yoke member and applying magnetic field to the moving coil, wherein the yoke member is formed by overlapping at least two members of different permeabilities so as to uniform each reluctance of lines of magnetic force being generated from the permanent magnets and flowing through the yoke member.

15 Claims, 3 Drawing Sheets

YOKE MEMBER FOR VOICE COIL MOTOR

BACKGROUND OF THE INVENTION

The present invention relates to a voice coil motor which is classified as a kind of a linear motor used for conveying a head of optical (or magneto-optical) disk drive or magnetic disk drive, and more particularly to an improved voice coil motor which causes magnetic flux density of an air gap to become uniform.

An optical head of an optical (or magneto-optical) disk drive or a magnetic head of a magnetic disk drive is installed to move in the direction of the disk's diameter to seek information recorded in the disk. To make the head trace a desired track fast and precisely, a motor having a quick response and constant control function is required.

FIG. 1 illustrates a conventional and typical voice coil motor for use in conveying a head. The voice coil motor comprises a yoke member 10 forming magnetic paths, a moving coil 20 wound movably around central portion 11 of yoke member 10, permanent magnets 30 and 30' being adhered on the respective upper and lower portions 12 and 12' of the yoke member 10 and applying a magnetic field to moving coil 20. Two permanent magnets 30 and 30' are disposed with like poles opposing each other. An air gap G having a predetermined space is formed between each of permanent magnets 30 and 30' and central portion 11 of yoke member 10, and at least part of moving coil 20 is placed in air gap G. When current flows through moving coil 20, electromagnetic thrust works perpendicularly to the directions of the current and the magnetic flux of permanent magnet 30 and 30' so as to move moving coil 20. Here, the thrust working to the moving coil 20 should be constant so as to easily control the position of the moving coil 20, and the magnetic flux density distributed in the air gap should be uniform so that the thrust works in constant strength. Thus, for better control characteristic of the voice coil motor, reluctance of the yoke member forming the magnetic path of the magnetic flux should be considered to cause the air-gap magnetic flux density to become uniform.

As shown in FIG. 1, the conventional voice coil motor has yoke member 10 made of a single material. However, since, among magnetic flux $f_{10}$ and $f_{20}$ flowing through the yoke member, the length of magnetic path where central flux $f_{11}$ and $f_{21}$ pass and the length of magnetic path where fringe flux $f_{12}$ and $f_{22}$ pass are different, the reluctance of each magnetic force line is non-uniform, which brings out partial difference in the density of the magnetic flux. The difference will be proven in the following equation.

$$P = \frac{Lm \cdot Ag \cdot f}{Lg \cdot Am \cdot R}$$

where
P is the permeance of the permanent magnet's working point;
Lm is the thickness of the permanent magnet;
Am is the area of the permanent magnet;
f is a leakage coefficient;
Lg is the length of the air gap;
Ag is the area of the air gap; and
R is reluctance.

That is, permeance P determining the working point of the permanent magnet is inversely proportional to reluctance R, and reluctance R is proportional to the length of magnetic path. This is because the permeance value depends on the length. Accordingly, as shown in FIG. 2, the conventional voice coil motor described above has non-uniform air gap magnetic flux density that is lower in the central portion and higher in the periphery, resulting in a bad control function.

SUMMARY OF THE INVENTION

Therefore, it is an object of the present invention to provide a voice coil motor having an excellent control function by improving a yoke member to cause the air gap magnetic flux density to become uniform.

To accomplish the object of the present invention, there is provided a voice coil motor comprising a yoke member composed of a central portion, upper/lower fringes and left/right fringes forming magnetic paths, a moving coil wound movably around the central portion of the yoke member, and permanent magnets being adhered on the upper/lower fringes of the yoke member and applying a magnetic field to the moving coil, wherein the yoke member is formed by overlapping at least two members of different permeabilities so as to cause the reluctance lines of magnetic force being generated from the permanent magnets and flowing through the yoke member to become uniform.

According to the present invention, considering that the reluctance of the magnetic force lines is proportional to the length of a magnetic path of each magnetic force line but is inversely proportional to the permeability of the members forming the magnetic paths, in order to cause all of the reluctance values of each magnetic force line become uniform, at least two members of different permeabilities are used so that central flux among the flux of the permanent magnets flows through a member of high permeability and fringe flux flows through a member of low permeability. In addition, since the reluctance is also inversely proportional to the sectional area of the member forming the magnetic path, the sectional area of the yoke member may be partly reduced or enlarged. However, this is undesirable because it is difficult to design and manufacture and further, the volume should be increased for high thrust.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
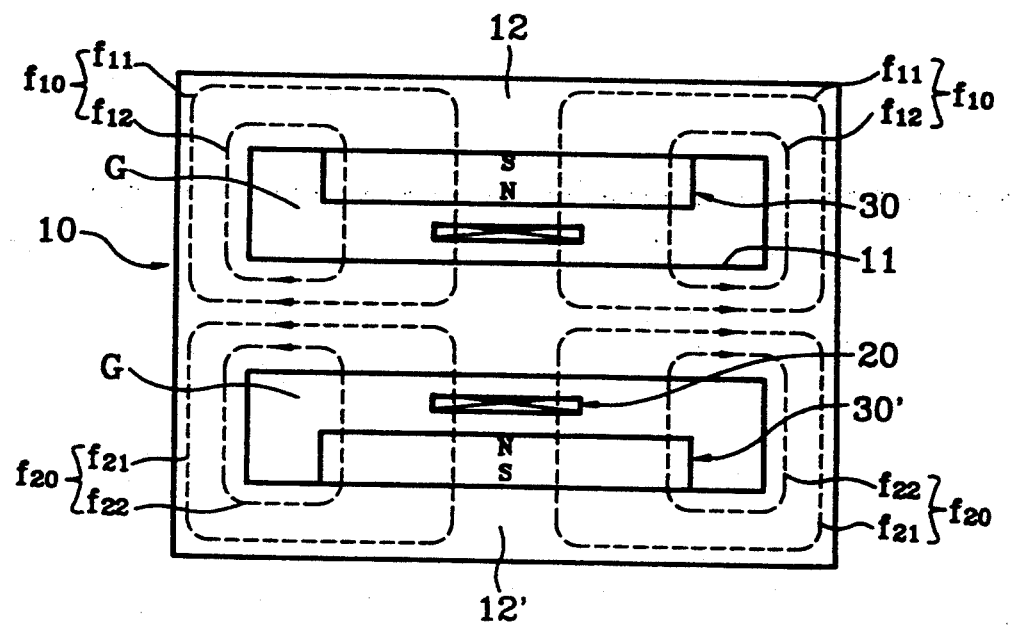
FIG. 1 illustrates the structure and the magnetic flux distribution of a conventional voice coil motor.
Figure 2:
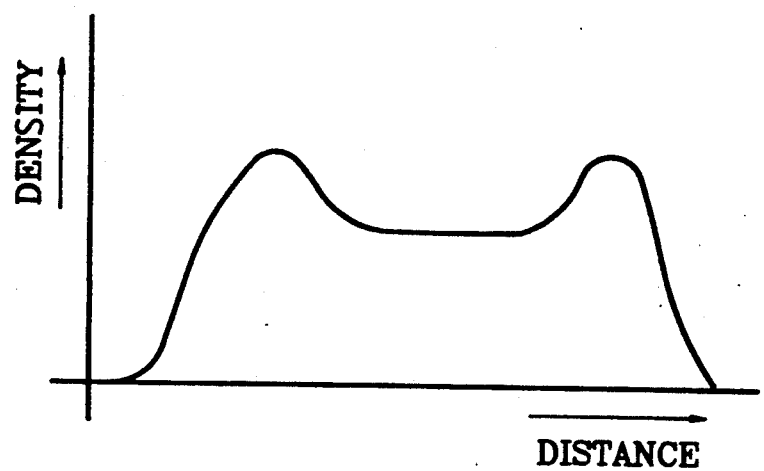
FIG. 2 illustrates an air-gap flux distribution where the abscissa represents the moving distance of the moving coil and the ordinate represents the density.

In the following description of the drawings, like elements as in FIG. 1 are numbered with like reference numerals. As shown in FIGS. 3, 4, 5 and 6, voice coil motors of the present invention have an improved yoke member 10A, 10B, 10C and 10D.

Figure 3:
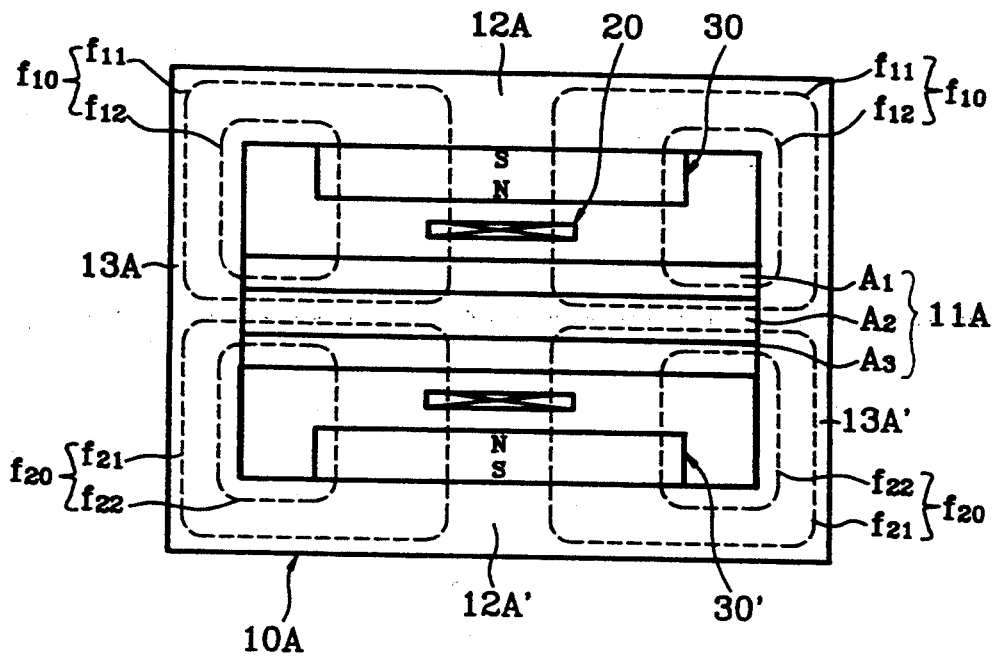
FIG. 3 illustrates the structure and the magnetic flux distribution of a voice coil motor according to the first embodiment of the present invention.

Improved yoke member 10A of FIG. 3 has a central portion 11A consisting of three members A1, A2 and A3, and upper/lower fringes 12A and 12A' and left/right fringes 13A and 13A' which are made of a single member, respectively. After interlinking part of moving coil 20 while passing through air gap G, magnetic flux $f_{10}$ and $f_{20}$ generated from one magnetic pole (pole N) of permanent magnets 30 and 30' are divided into central flux $f_{11}$ and $f_{21}$ and fringe flux $f_{12}$ and $f_{22}$ to advance in the opposite direction. Here, central flux $f_{11}$ and $f_{21}$ pass through central member A2 and fringe flux $f_{12}$ and $f_{22}$ pass through upper and lower members A1 and A3. Therefore, in this embodiment, the permeability of central member A2 among three members A1, A2 and A3 is higher than those of other members A1 and A3 which are made of material of the same permeability.

Figure 4:
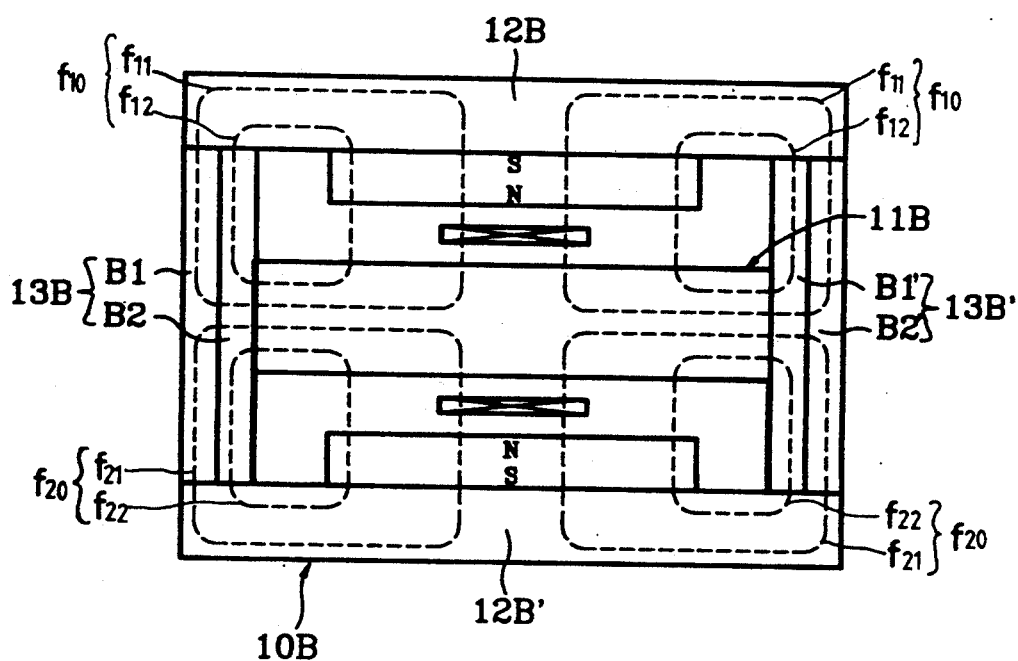
FIG. 4 illustrates the structure and the magnetic flux distribution of a voice coil motor according to the second embodiment of the present invention.

Yoke member 10B of FIG. 4 has central portion 11B and upper/lower fringes 12B and 12B' made of a single member, and left/right fringes 13B and 13B' made of two members B1 and B2 or B1' and B2'. Central flux $f_{11}$ and $f_{21}$ among flux of permanent magnets 30 and 30' pass through outer members B1 and B1' in left/right fringes 13B and 13B', and fringe flux $f_{12}$ and $f_{22}$ pass through inner members B2 and B2'. Here, the permeabilities of outer members B1 and B1' are higher than those of inner members B2 and B2'.

Figure 5:
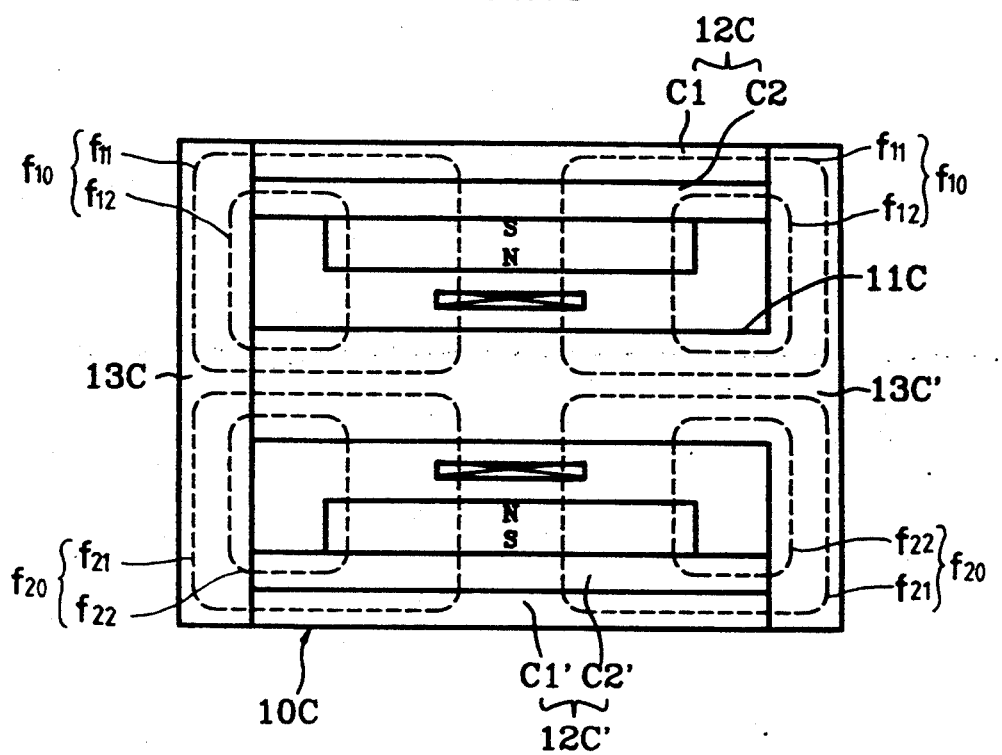
FIG. 5 illustrates the structure and the magnetic flux distribution of a voice coil motor according to the third embodiment of the present invention.

Yoke member 10C of FIG. 5 has central portion 11C and left/right fringes 13C and 13C' made of a single member, upper/lower fringes 12C and 12C' made of two members C1 and C2 or C1' and C2'. Central flux $f_{11}$ and $f_{21}$ among flux of permanent magnets 30 and 30' pass through outer members C1 and C1' in upper/lower fringes 12C and 12C', and fringe flux $f_{12}$ and $f_{22}$ pass through inner members C2 and C2'. Here, the permeabilities of outer members C1 and C1' is higher than those of inner members C2 and C2'.

Figure 6:
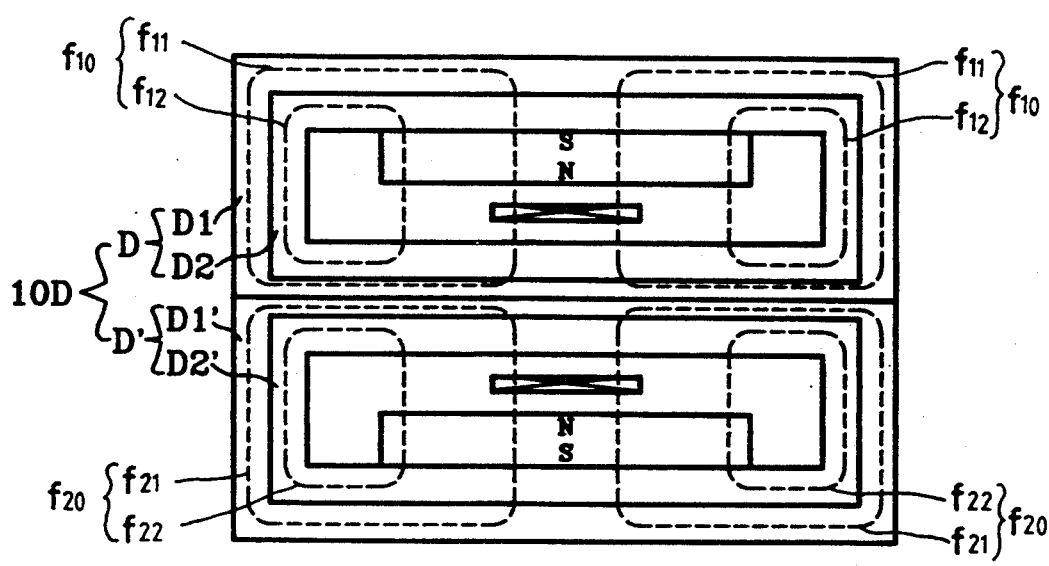
FIG. 6 illustrates the structure and the magnetic flux distribution of a voice coil motor according to the fourth embodiment of the present invention.

Yoke member 10D of FIG. 6 is composed of upper yoke D and lower yoke D' which are joined to each other. Upper and lower yokes D and D' each consists of outer toroidal member D1 or D1' and inner toroidal member D2 or D2'. Yokes D and D' are symmetrical to each other and form a separate magnetic path, respectively. Flux $f_{10}$ ($f_{11}$ and $f_{12}$) generated from upper permanent magnet 30 passes through upper yoke D, and flux $f_{20}$ ($f_{21}$ and $f_{22}$) generated from lower permanent magnet 30' passes through lower yoke D'. Here, the permeabilities of outer toroidal members D1 and D1' where central flux $f_{11}$ and $f_{21}$ flow is higher than those of inner toroidal members D2 and D2' where fringe flux $f_{12}$ and $f_{22}$ flow.

As described above in detail, the present invention is designed to minimize the difference of density with respect to the magnetic force lines of the permanent magnet by using material of different permeabilities differing according to magnetic paths as the yoke member forming a magnetic path and provides a linear voice coil motor having uniform density of air gap flux and uniform movement control characteristic of the moving coil throughout the whole section. If used in an optical (or magneto-optical) disk drive or a magnetic disk drive, the voice coil motor of the present invention will reduce errors during seek and process information rapidly, thereby enhancing the reliability of the product.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A voice coil motor comprising:
   a yoke member composed of a central portion, upper/lower fringes and left/right fringes forming magnetic paths;
   a moving coil movably around the central portion of said yoke member; and
   permanent magnets adhered on the upper/lower fringes of said yoke member, said permanent magnets applying a magnetic field to the moving coil and generating a flux flow,
   wherein at least a portion of said yoke member comprises at least two abutting members of different permeabilities arranged parallel to a direction of flux flow in the permanent magnets so as to cause reluctance lines of magnetic force being generated from said permanent magnets and flowing through said yoke member to become uniform.

2. The voice coil motor as claimed in claim 1, wherein the central portion of said yoke member is composed of two fringe members and a central member, the central member being of higher permeability than the two fringe members, so that fringe flux generated by said permanent magnets passes through the member of low permeability and central flux generated by said permanent magnets passes through the member of high permeability.

3. The voice coil motor as claimed in claim 1, wherein left/right fringes comprise two abutting members one member being of higher permeability than the other member, so that fringe flux generated by said permanent magnets passes through the member of lower permeability and central flux passes through the member of higher permeability.

4. The voice coil motor as claimed in claim 1, wherein said yoke member is composed of joined upper and lower yokes, and the upper and lower yokes are formed with an inner toroidal member of low permeability and an outer toroidal member of high permeability, respectively.

5. The voice coil motor as claimed in claim 1, wherein the upper/lower fringes comprise two abutting members, one member being of higher permeability than the other member, so that fringe flux generated by said permanent magnets passes through the member of lower permeability and the central flux passes through member of higher permeability.

6. A voice coil motor as claimed in claim 2, wherein the fringe flux only passes through the member having lower permeability.

7. A voice coil motor as claimed in claim 3, wherein the fringe flux only passes through the member having lower permeability.

8. A voice coil motor as claimed in claim 4, wherein the fringe flux only passes through the inner toroidal member.

9. A voice coil motor comprising:

a yoke member composed of a central element, upper/lower fringes and left/right fringes and forming a magnetic path;

permanent magnets adhered on the upper/lower fringes of said yoke member, said permanent magnets generating fringe flux and central flux; and a rotating coil wound around the central element of said yoke member, wherein at least a portion of said yoke member comprises at least two members of different permeabilities arranged in a direction parallel to an axis of rotation of said rotating coil.

10. The voice coil motor as claimed in claim 6, wherein the central portion of said yoke member is composed of two fringe members which oppose an air gap and a central member, each member being arranged in a direction parallel to the axis of rotation of said rotating coil, the central member being of higher permeability than the two fringe members, so that fringe flux generated by said permanent magnets passes through the member of low permeability and central flux generated by said permanent magnets passes through the member of high permeability.

11. The voice coil motor as claimed in claim 10, wherein the fringe flux only passes through the member having lower permeability.

12. The voice coil motor as claimed in claim 9, wherein the upper/lower fringes are composed of two abutting fringe members arranged in a direction parallel to the axis of rotation of said rotating coil, one member being of higher permeability than the other member so that so that fringe flux generated by said permanent magnets passes through the member of lower permeability and central flux generated by said permanent magnets passes through the member of higher permeability.

13. The voice coil motor as claimed in claim 12, wherein the fringe flux only passes through the member having lower permeability.

14. The voice coil motor as claimed in claim 9, wherein said yoke member comprises joined upper and lower yokes, each yoke having an inner toroidal member of low permeability and an outer toroidal member of high permeability so that fringe flux generated by said permanent magnets passes through the inner toroidal member of lower permeability and central flux generated by said permanent magnets passes through the outer toroidal member of higher permeability.

15. The voice coil motor as claimed in claim 14, wherein the fringe flux only passes through the inner toroidal member having lower permeability.

* * * * *

UNITED STATES PATENT AND TRADEMARK OFFICE
CERTIFICATE OF CORRECTION

PATENT NO. : 5,202,595

DATED : April 13, 1993

INVENTOR(S) : Sim et al.

It is certified that error appears in the above-identified patent and that said Letters Patent is hereby corrected as shown below:

Claim 1, col. 4, line 15, after "coil" insert --wound--.

Signed and Sealed this

Eighth Day of February, 1994

Attest:

BRUCE LEHMAN

Attesting Officer  Commissioner of Patents and Trademarks